United States Patent
Potthoff

(10) Patent No.: US 6,419,474 B1
(45) Date of Patent: Jul. 16, 2002

(54) INJECTION-MOLDING NOZZLE ASSEMBLY

(76) Inventor: Rüdiger Potthoff, Herlinghausen 4, Kierspe (DE)

(*) Notice: Subject to any disclaimer, the term of this patent is extended or adjusted under 35 U.S.C. 154(b) by 36 days.

(21) Appl. No.: 09/595,372

(22) Filed: Jun. 15, 2000

(30) Foreign Application Priority Data

Jun. 15, 1999 (DE) .......................................... 199 27 199
Apr. 20, 2000 (DE) .......................................... 100 19 722

(51) Int. Cl.[7] .............................................. B29C 47/70
(52) U.S. Cl. ................ 425/197; 376/382 R; 376/382.4
(58) Field of Search ............................ 425/197, 376.1, 425/382 R, 382.4, 567, 568

(56) References Cited

U.S. PATENT DOCUMENTS 5,250,249 A * 10/1993 Garner ........................ 425/197

* cited by examiner

Primary Examiner—Tim Heitbrink
(74) Attorney, Agent, or Firm—Herbert Dubno; Andrew Wilford

(57) ABSTRACT

An extruder has an outlet fitting having a passage with a frustoconical portion centered on an axis. A flow controller in the passage is formed with a conical extension centered on the axis and fitting complementarily in the frustoconical fitting passage, that is extending downstream relative to a flow direction of plastified resin through the outlet-fitting passage. An array of axially throughgoing flow passages formed in the controller are spaced angularly about the axis and have frustoconically flared upstream ends. The controller has a radially outwardly projecting flange bearing axially on the outlet fitting and generally blocks the outlet-fitting passage so that all plastified resin must move through the flow-controller flow passages.

20 Claims, 4 Drawing Sheets

INJECTION-MOLDING NOZZLE ASSEMBLY

FIELD OF THE INVENTION

The present invention relates to injection molding. More particularly this invention concerns a nozzle assembly used between the outlet end of an injection-molding machine and a mold.

BACKGROUND OF THE INVENTION

An injection-molding machine typically has a housing forming an elongated cylindrical passage centered on an axis and provided with a screw-like worm that is rotated to move plastic from an intake end to an output end. As the plastic is moved through the passage it is converted from granules or particles by means of heat and pressure to a hot and highly viscous liquid. At the outlet end the plastified material, often polyethylene, is forced into a mold where it is allowed to cool and cure, producing a molded article.

The outlet end of the extruder is normally provided with an adapter or outlet fitting having a passage extending from an inlet end where it has a large diameter to fit with the large-diameter outlet end of the extruder to a small-diameter outlet end that is fitted to the mold. Thus the passage tapers downstream, normally frustoconically.

The problem with such system is that the resin does not flow uniformly through the adapter fitting. It therefore moves slowly along its inner walls and, since the adapter is normally heated to keep the resin liquified, can burn and adhere to these inner walls, forming a deposit. With time the burnt deposit builds up and flakes away, allowing small burnt particles to get into the stream passing through the fitting. When the molded workpiece is being made fully transparent, such inclusions can ruin the looks of the end product, making it unacceptable.

OBJECTS OF THE INVENTION

It is therefore an object of the present invention to provide an improved nozzle assembly for an injection-molding extruder.

Another object is the provision of such an improved nozzle assembly for an injection-molding extruder which overcomes the above-given disadvantages, that is which surely eliminates the possibility of the plastified resin burning on the nozzle walls.

A further object is to provide an improved injection-molding system which produces high-quality transparent articles with no burnt-plastic inclusions.

SUMMARY OF THE INVENTION

An extruder has an outlet fitting having a passage with a frustoconical portion centered on an axis. According to the invention a flow controller in the passage is formed with a conical extension centered on the axis and fitting complementarily in the frustoconical fitting passage, that is extending downstream relative to the flow direction. An array of axially throughgoing flow passages formed in the controller are spaced angularly about the axis and have frustoconically flared upstream ends. The controller has a radially outwardly projecting flange bearing axially on the outlet fitting and generally blocks the outlet-fitting passage so that all liquefied resin must move through the flow-controller flow passages.

Thus this flow controller prevents flow from slowing down and keeps it all moving rapidly enough that it cannot burn into place before getting into the mold. The construction of the controller is such that there are no pockets where flow is so slow that the plastic can get burnt, eliminating the possibility of burnt inclusions in the finished product. The flow controller can be made simply by standard turning and boring operations.

The controller in accordance with the invention is formed with another conical extension centered on the axis and directed axially oppositely to the extension fitting in the passage, that is upstream.

The downstream extension can according to the invention form with the frustoconical passage portion a frustoconical space of predetermined radial dimension. In this case the flow passages are cylindrical, identical, and of a diameter equal generally to the radial dimension. They are spaced from each other by a distance equal to less than the radial dimension and extend parallel to the axis. Their frustoconically flared upstream ends overlap angularly so that the flow controller presents to the incoming flow virtually nothing but a series of sharp edges, eliminating pockets where the resin can pool and bake onto the body of the flow controller.

The outlet fitting has an annular planar face extending perpendicular to the axis and the flange has a planar end face bearing axially on the planar fitting face. Thus the controller fits tightly on the fitting with no leakage between them.

In another system according to the invention the downstream extension fits snugly in the frustoconical passage portion and the passages are formed as radially outwardly open grooves. The controller is formed on the axis with a central axially throughgoing bore having a frustoconically flared upstream end. The frustoconically flared upstream end of the central bore radially overlaps the frustoconically flared upstream ends of the flow passages.

In accordance with the invention the controller is formed with a seat at the upstream flow-passage ends. The extruder has an end fitting with a downstream end fitting complementarily in the seat. This end fitting has a substantially planar downstream end face bearing axially on the controller and is formed with a radially open passage opening at the downstream end face. More particularly, the seat has a cylindrical inner surface and the downstream end-fitting end has a cylindrical outer surface fitting snugly therewith.

BRIEF DESCRIPTION OF THE DRAWING

The above and other objects, features, and advantages will become more readily apparent from the following description, reference being made to the accompanying drawing in which.

SPECIFIC DESCRIPTION

Figure 5:
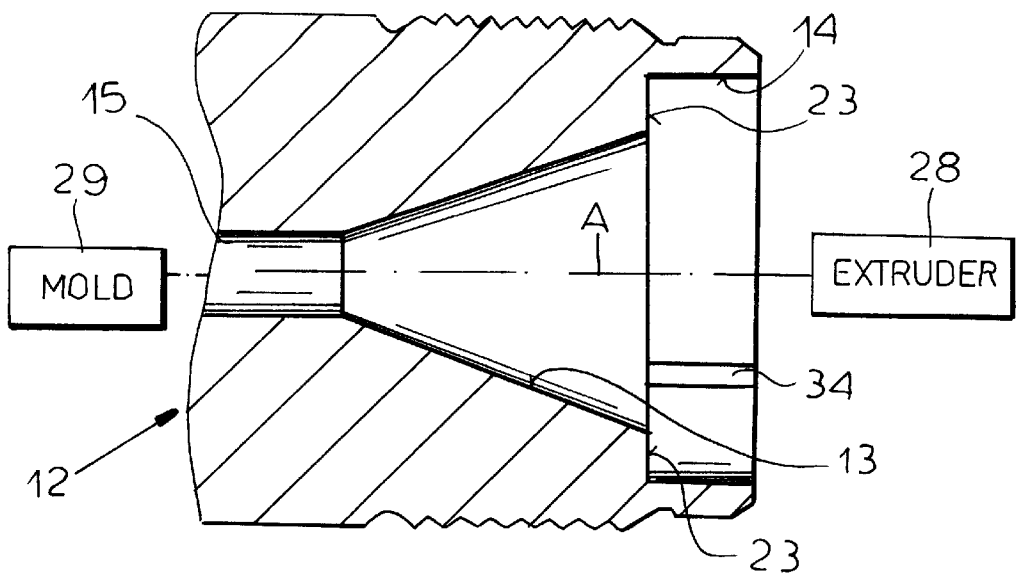
FIG. 5 is a partly diagrammatic view of an extruder system showing an adapter fitting in section.

As seen in FIG. 5 a standard extruder 28 comprised of a housing having a passage holding a worm feeds plastified resin along an axis A through an adapter or nozzle fitting 12 to a mold 29. The fitting 12 has a central small-diameter cylindrical outlet passage section 15 extending from the downstream end of an upstream passage section 13 flared at an apex angle of about 20° toward the extruder 28. A cylindrical recess or seat at the wide end of the flared passage section 13 has a cylindrical side-wall surface 14 and a planar end-wall surface 23. The nozzle fitting 12 is normally screwed into a downstream end of the passage of the extruder 28.

Figure 1:
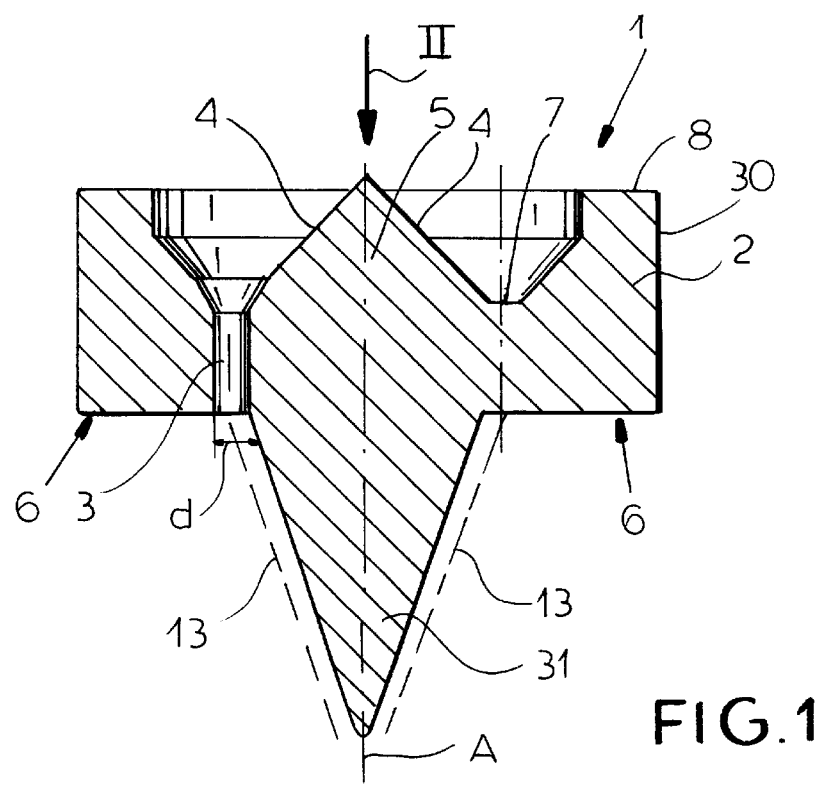
FIG. 1 is an axial section through a flow controller according to the invention.
Figure 2:
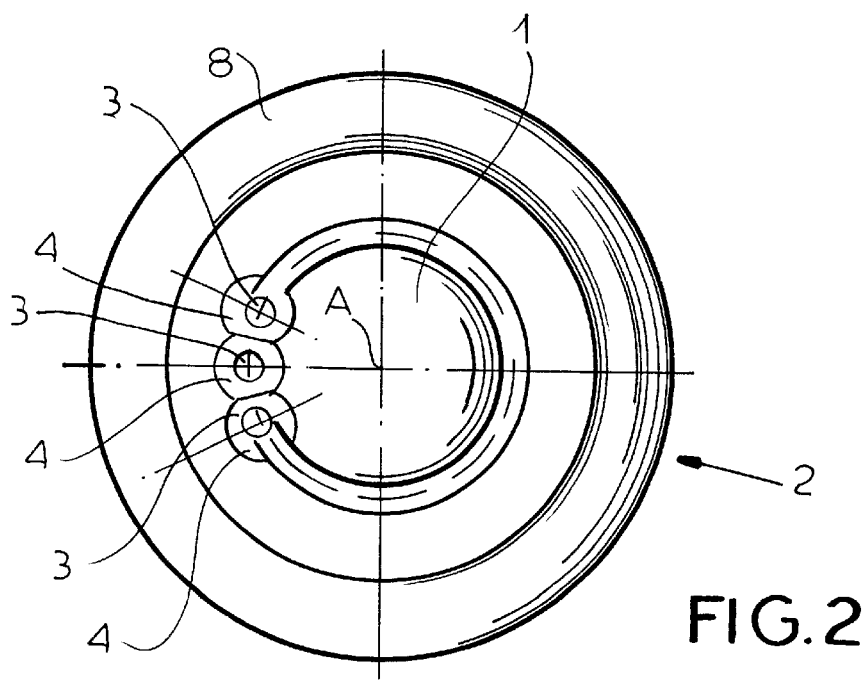
FIG. 2 is an end view taken in the direction of arrow II of FIG. 1.

According to the invention as shown in FIGS. 1 and 2 a flow controller 1 centered on the axis A has a conical downstream projection 31, a radially projecting cylindrical flange 2 with a planar end surface 6 that normally seats flatly on the surface 23 and a cylindrical side surface 30 that fits snugly within the surface 14, and an upstream conical projection 5. The flange 2 is formed with an array of angularly equispaced cylindrical holes 3 extending parallel to the axis A and each of a diameter d. They are angularly so closely spaced that the webs 7 formed between them have an angular dimension smaller than the diameter d. Furthermore a conical outer surface of the downstream projection 31 is spaced inward from the frustoconical passage section 13 (shown in FIG. 1 by a dashed line) by a distance equal substantially to the diameter d. In addition the upstream end of each of the bores or passages 3 is formed with a frustoconical countersink 4 of such a diameter that these countersinks 4 run together as shown in FIG. 2. The webs 7 therefore define upstream-directed edges lying in a plane perpendicular to the axis A. The flange 2 has a planar upstream face 8 extending perpendicular the axis A and normally pressed by part of the extruder 28 so as to urge the face 6 against the surface 23. The controller 1 is fixed against rotation in the fitting 12.

Figure 3:
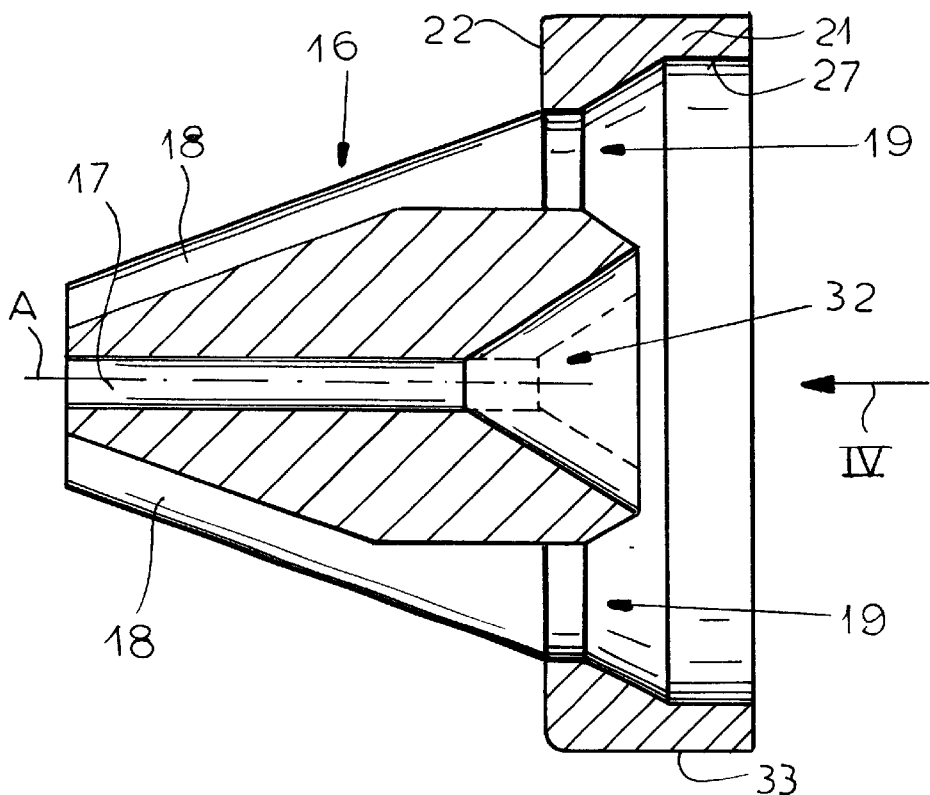
FIG. 3 is an axial section through another flow controller in accordance with the invention.
Figure 4:
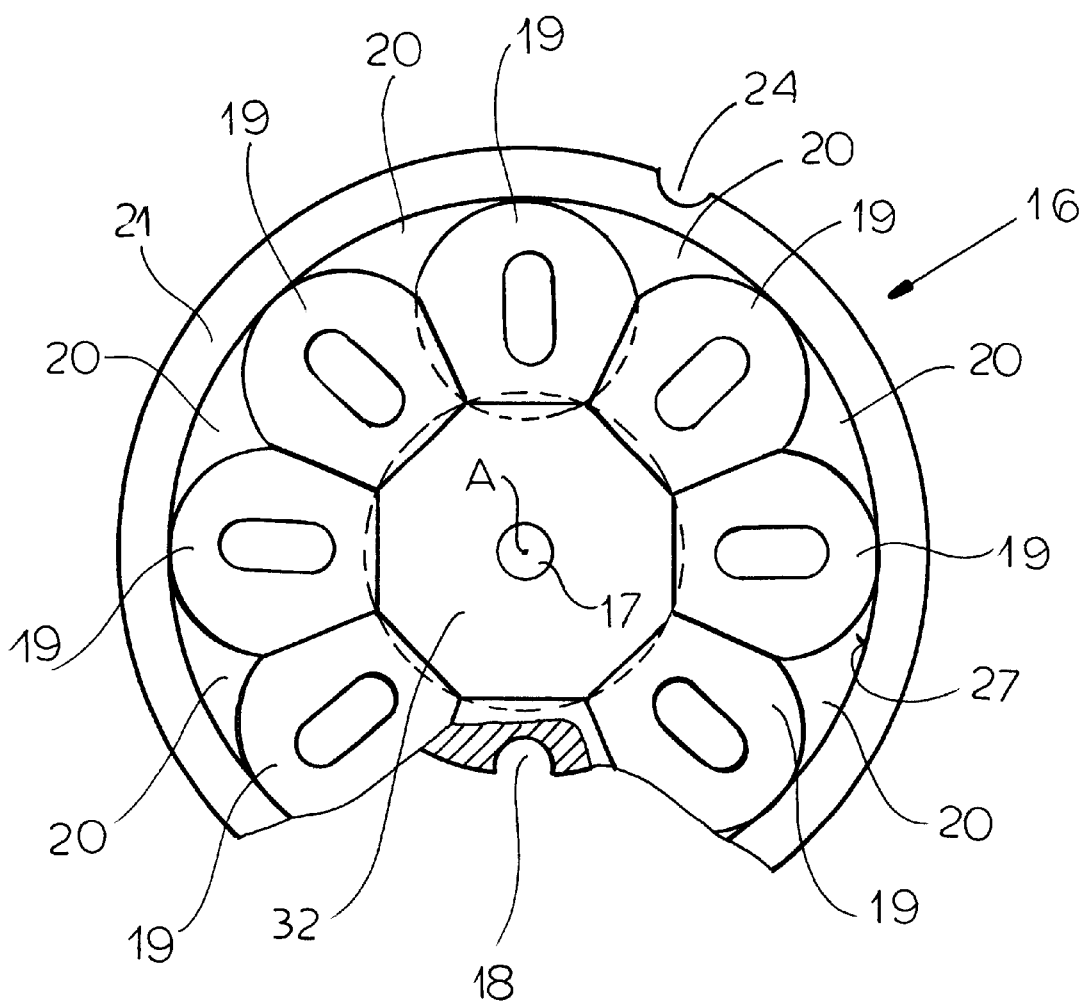
FIG. 4 is a partly sectional end view taken in the direction of arrow IV of FIG. 3.
Figure 7:
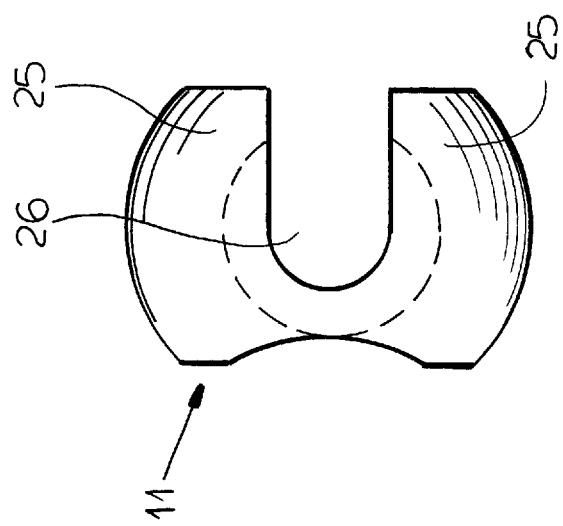
FIG. 7 is an end view taken in the direction of arrow VII of FIG. 6.
Figure 6:
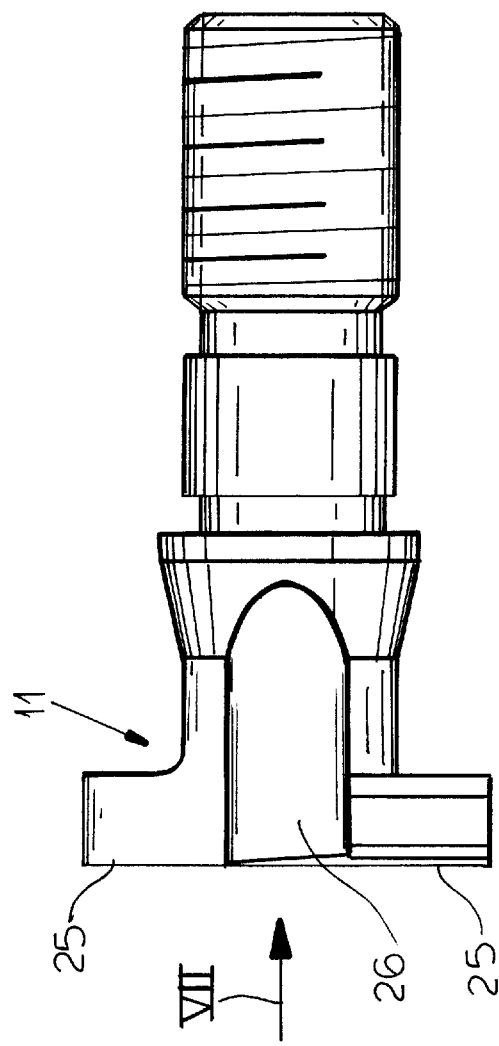
FIG. 6 is a side view of an end fitting for an extruder worm according to the invention.

In the arrangement of FIGS. 3 and 4 a flow controller 16 has a small-diameter central bore 17 with an upstream centered countersink 32 and is formed with an array of eight passages 18 formed as radially outwardly open grooves. Upstream ends of the grooves 18 open into frustoconical countersinks 19, leaving small and angled flat surfaces 20 facing upstream. The controller 16 has a flange or collar 21 with a face 22 directed axially downstream and adapted to sit on the surface 23 and a cylindrical outer surface 33 dimensioned to fit snugly within the surface 14. In addition this flange 21 forms a cylindrical inner surface 27. A radially outwardly open and axially extending groove 24 in the flange 21 fits with a radially inwardly projecting and axially extending rib 34 on the surface 14 to prevent the controller 16 from rotating in the nozzle fitting 12.

According to the invention the extruder 28 can have a worm whose downstream end is provided with a fitting 11 having a planar end surface 25 adapted to bear on the surfaces 20 and lying in a plane perpendicular to the axis A. This fitting 11 fits within the surface 27 and has an angled surface portion forming the outlet end of a helical feed passage 26. Thus the flow controller forms in effect a seat in which the fitting 11 at the end of the extruder worm fits, ensuring that plastified resin will be passed smoothly through the controller 16 without depositing on its walls.

I claim:

1. In combination with an extruder and an outlet fitting having a passage with a frustoconical portion centered on an axis, a flow controller formed with
   a downstream conical extension centered on the axis and fitting complementarily in the frustoconical fitting passage,
   an array of axially throughgoing flow passages spaced angularly about the axis and having frustoconically flared upstream ends,
   an upstream conical extension centered on the axis and directed axially oppositely to the downstream extension, and
   a radially outwardly projecting flange bearing axially on the outlet fitting.

2. The combination defined in claim 1 wherein the downstream extension forms with the frustoconical passage portion a frustoconical space of a predetermined radial dimension.

3. The combination defined in claim 2 wherein the flow passages are cylindrical, identical, and of a diameter equal generally to the radial dimension.

4. The combination defined in claim 2 wherein the flow passages are spaced from each other by a distance equal to less than the radial dimension.

5. The combination defined in claim 1 wherein the flow passages extend parallel to the axis.

6. The combination defined in claim 1 wherein the frustoconically flared upstream ends overlap angularly.

7. The combination defined in claim 1 wherein the outlet fitting has an annular planar face extending perpendicular to the axis and the flange has a planar end face bearing axially on the planar fitting face.

8. The combination defined in claim 1 wherein the downstream extension fits snugly in the frustoconical passage portion and the passages are formed as radially outwardly open grooves.

9. In combination with an extruder and an outlet fitting having a passage with a frustoconical portion centered on an axis, a flow controller formed with
   a conical extension centered on the axis and fitting complementarily in the frustoconical fitting passage,
   an array of axially throughgoing flow passages spaced angularly about the axis and having frustoconically flared upstream ends,
   a central axially throughgoing bore having a frustoconically flared upstream end, and
   a radially outwardly projecting flange bearing axially on the outlet fitting.

10. The combination defined in claim 9 wherein the frustoconically flared upstream end of the central bore radially overlaps the frustoconically flared upstream ends of the flow passages.

11. The combination defined in claim 9 wherein the controller is formed with a seat at the upstream flow-passage ends, the extruder having an end fitting with a downstream end fitting complementarily in the seat.

12. The combination defined in claim 11 wherein the end fitting has a substantially planar downstream end face bearing axially on the controller and is formed with a radially open passage also opening at the downstream end face.

13. The combination defined in claim 9 wherein the seat has a cylindrical inner surface and the downstream end-fitting end has a cylindrical outer surface fitting snugly therewith.

14. The combination defined in claim 9 wherein the extension forms with the frustoconical passage portion a frustoconical space of a predetermined radial dimension.

15. The combination defined in claim 14 wherein the flow passages are cylindrical, identical, and of a diameter equal generally to the radial dimension.

16. The combination defined in claim 14 wherein the flow passages are spaced from each other by a distance equal to less than the radial dimension.

17. The combination defined in claim 9 wherein the flow passages extend parallel to the axis.

18. The combination defined in claim 9 wherein the frustoconically flared upstream ends overlap angularly.

19. The combination defined in claim 9 wherein the outlet fitting has an annular planar face extending perpendicular to the axis and the flange has a planar end face bearing axially on the planar fitting face.

20. The combination defined in claim 9 wherein the flow conical extension fits snugly in the frustoconical passage portion and the passages are formed as radially outwardly open grooves.

* * * * *